(12) United States Patent
Yip et al.

(10) Patent No.: US 12,056,809 B2
(45) Date of Patent: Aug. 6, 2024

(54) METHOD AND APPARATUS FOR AR REMOTE RENDERING PROCESSES

(71) Applicant: SAMSUNG ELECTRONICS CO., LTD., Suwon-si (KR)

(72) Inventors: Eric Yip, Suwon-si (KR); Hyunkoo Yang, Suwon-si (KR); Jaeyeon Song, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 107 days.

(21) Appl. No.: 17/662,987

(22) Filed: May 11, 2022

(65) Prior Publication Data

US 2022/0366641 A1 Nov. 17, 2022

(30) Foreign Application Priority Data

May 11, 2021 (KR) .................. 10-2021-0060926

(51) Int. Cl.
*G06T 15/00* (2011.01)
*G06T 7/73* (2017.01)
*G06T 15/20* (2011.01)
*G06T 19/00* (2011.01)

(52) U.S. Cl.
CPC .............. *G06T 15/205* (2013.01); *G06T 7/75* (2017.01); *G06T 19/006* (2013.01)

(58) Field of Classification Search
CPC ......... G06T 19/00; G06T 17/20; G06T 17/00; G06T 15/10; G06T 15/00
USPC ....................................... 345/419
See application file for complete search history.

(56) References Cited

U.S. PATENT DOCUMENTS

| 10,417,829 B2 | 9/2019 | Kim et al. | |
| 2010/0257252 A1* | 10/2010 | Dougherty | G06V 10/95 |
| | | | 709/217 |
| 2013/0088424 A1* | 4/2013 | Han | A63F 13/42 |
| | | | 345/156 |
| 2016/0267720 A1* | 9/2016 | Mandella | G06F 3/03545 |

(Continued)

FOREIGN PATENT DOCUMENTS

| KR | 20190062102 A | 6/2019 |
| KR | 20210024071 A | 3/2021 |
| KR | 20220012658 A | 2/2022 |

OTHER PUBLICATIONS

International Search Report and Written Opinion of the International Searching Authority dated Aug. 19, 2022, in connection with International Application No. PCT/KR2022/006748, 7 pages.

*Primary Examiner* — Gordon G Liu

(57) ABSTRACT

A method for augmented reality (AR) remote rendering process performed by a remote rendering device. The method includes performing 3D scene compositing based on a live geometry information and an anchor information; receiving, from an AR device, a pose information; rendering 2D frame of the composited 3D scene based on the pose information; performing 2D frame processing on the rendered 2D frame; creating a first metadata associated with the 2D frame processing, a second metadata associated with the rendered 2D frame and a third metadata associated with AR frame compositing of the rendered 2D frame; and transmitting, to the AR device, the rendered 2D frame, the first metadata, the second metadata and the third metadata.

16 Claims, 17 Drawing Sheets

(56) References Cited

U.S. PATENT DOCUMENTS

| | | |
|---|---|---|
| 2019/0114830 A1 | 4/2019 | Bouazizi et al. |
| 2019/0222822 A1* | 7/2019 | Wang .................... G06F 16/282 |
| 2019/0385356 A1 | 12/2019 | Lodato et al. |
| 2020/0051334 A1 | 2/2020 | Leung et al. |
| 2021/0264658 A1 | 8/2021 | Varekamp et al. |
| 2022/0028172 A1 | 1/2022 | Yip et al. |

* cited by examiner

METHOD AND APPARATUS FOR AR REMOTE RENDERING PROCESSES

CROSS-REFERENCE TO RELATED APPLICATIONS

This application is based on and claims priority under 35 U.S.C. § 119 to Korean Patent Application No. 10-2021-0060926 filed on May 11, 2021, in the Korean Intellectual Property Office, the disclosure of which is incorporated by reference herein in its entirety.

BACKGROUND

1. Field

The disclosure relates to multimedia content processing authoring, pre-processing, post-processing, metadata delivery, delivery, decoding and rendering of, virtual reality, mixed reality and augmented reality contents, including two dimensional (2D) video, 360 video, 3D media represented by point clouds and meshes. Furthermore, the disclosure relates to scene descriptions, dynamic scene descriptions, dynamic scene descriptions supporting timed media, scene description formats, graphics language transmission file format (glTF). Moving picture expert group (MPEG) media, international standard organization base media file format (ISOBMFF) file format. Virtual reality (VR) devices, extended reality (XR) devices. Support of immersive contents and media. Dynamic scene updates based on coordinated universal time/international atomic time (UTC/TAI) time, presentation time, or events (possibly triggered by user interactions).

2. Description of Related Art

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

SUMMARY

A big challenge in VR and AR is the amount of computational power required for the processing of multimedia contents for such immersive experiences. Since the form factors of VR and augmented reality (AR) devices are typically head mounted display (HMDs) or even glasses (such as AR glasses), these form factors have an inherent limitation in computation power (processing power), as well as in battery capacity (power consumption).

As in cloud gaming, computational heavy processing is performed in the cloud. Likewise, for VR and AR services, it is also possible to perform certain computational heavy processes in a remote server.

However, since specific services such as AR require very exact augmentations of content into the user's environment via their device display. As such, remote rendering for AR services are sensitive to latencies between the rendered 2D frames and the time of augmentation/display.

Existing processing flows for cloud gaming does not consider the redundancies when rendering for AR, nor does it consider the extra AR compositing requirements on the AR device when remote rendering is used.

The present disclosure defines a processing flow for AR services, including an extra processing of the rendered 2D frame before it is encoded and sent to the device. In addition, extra processing related to AR composition is also defined in the AR device. For both frame processing and compositing steps, the required metadata are defined, and the resulting effects of these steps are also explained.

In an embodiment, a method for AR (augmented reality) remote rendering process performed by a remote rendering device. The method includes performing 3D scene compositing based on a live geometry information and an anchor information; receiving, from an AR device, a pose information; rendering 2D frame of the composited 3D scene based on the pose information; performing 2D frame processing on the rendered 2D frame; creating a first metadata associated with the 2D frame processing, a second metadata associated with the rendered 2D frame and a third metadata associated with AR frame compositing of the rendered 2D frame; and transmitting, to the AR device, the rendered 2D frame, the first metadata, the second metadata and the third metadata.

In an embodiment, a method for AR (augmented reality) remote rendering process performed by an AR device. the method includes receiving, from a remote rendering device, a rendered 2D frame, a first metadata associated with a 2D frame processing, a second metadata associated with the rendered 2D frame and a third metadata associated with AR frame compositing of the rendered 2D frame; performing the AR frame compositing based on the first metadata, the second metadata and the third metadata; and displaying the composited AR frame.

In an embodiment, a remote rendering device is provided. The remote rendering device includes a transceiver and a processor. The processor is configured to perform 3D scene compositing based on a live geometry information and an anchor information; receive, from an AR device via the transceiver, a pose information; render 2D frame of the composited 3D scene based on the pose information; perform 2D frame processing on the rendered 2D frame; create a first metadata associated with the 2D frame processing, a second metadata associated with the rendered 2D frame and a third metadata associated with AR frame compositing of the rendered 2D frame; and transmit, to the AR device via the transceiver, the rendered 2D frame, the first metadata, the second metadata and the third metadata.

In an embodiment, an AR device is provided. The AR device includes a transceiver and a processor. The processor is configured to receive, from a remote rendering device via the transceiver, a rendered 2D frame, a first metadata associated with a 2D frame processing, a second metadata associated with the rendered 2D frame and a third metadata associated with AR frame compositing of the rendered 2D frame; perform the AR frame compositing based on the first metadata, the second metadata and the third metadata; and display the composited AR frame.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
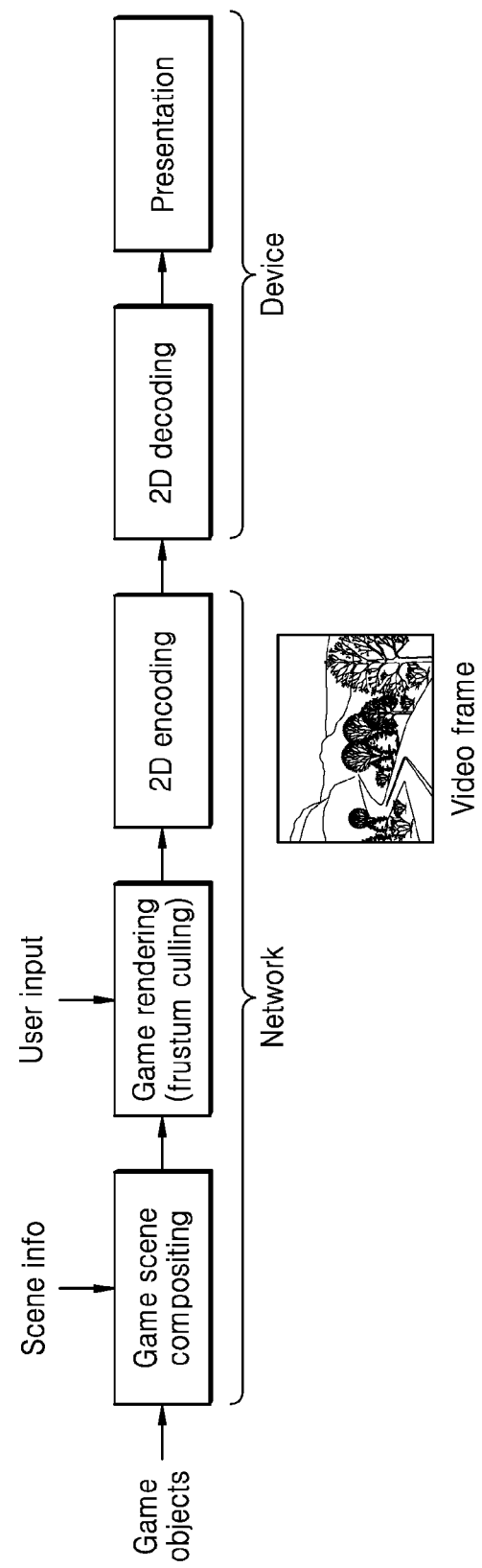
FIG. 1 illustrates an example of a typical cloud gaming processing flow.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Throughout the disclosure, the expression "at least one of a, b or c" indicates only a, only b, only c, both a and b, both a and c, both b and c, all of a, b, and c, or variations thereof. Throughout the specification, a layer (or a layer apparatus) may also be referred to as an entity. Hereinafter, operation principles of the disclosure will be described in detail with reference to accompanying drawings. In the following descriptions, well-known functions or configurations are not described in detail because they would obscure the disclosure with unnecessary details. The terms used in the specification are defined in consideration of functions used in the disclosure, and can be changed according to the intent or commonly used methods of users or operators. Accordingly, definitions of the terms are understood based on the entire descriptions of the present specification.

For the same reasons, in the drawings, some elements may be exaggerated, omitted, or roughly illustrated. Also, a size of each element does not exactly correspond to an actual size of each element. In each drawing, elements that are the same or are in correspondence are rendered the same reference numeral.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein; rather, these embodiments of the disclosure are provided so that this disclosure will be thorough and complete, and will fully convey the concept of the disclosure to one of ordinary skill in the art. Therefore, the scope of the disclosure is defined by the appended claims. Throughout the specification, like reference numerals refer to like elements. It will be understood that blocks in flowcharts or combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s).

The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufactured items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two consecutive blocks may also be executed simultaneously or in reverse order depending on functions corresponding thereto.

As used herein, the term "unit" denotes a software element or a hardware element such as a field-programmable gate array (FPGA) or an application-specific integrated circuit (ASIC), and performs a certain function. However, the term "unit" is not limited to software or hardware. The "unit" may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables.

Functions provided by the elements and "units" may be combined into the smaller number of elements and "units," or may be divided into additional elements and "units." Furthermore, the elements and "units" may be embodied to reproduce one or more central processing units (CPUs) in a device or security multimedia card. Also, in an embodiment of the disclosure, the "unit" may include at least one processor. In the following descriptions of the disclosure, well-known functions or configurations are not described in detail because they would obscure the disclosure with unnecessary details.

Recent advances in multimedia include research and development into the capture of multimedia, the storage of such multimedia (formats), the compression of such multimedia (codecs etc.), as well as the presentation of such multimedia in the form of new devices which can provide users with more immersive multimedia experiences. With the pursuit of higher resolution for video, namely 8K resolution, and the display of such 8K video on ever larger TV displays with immersive technologies such as HDR, the focus in a lot of multimedia consumption has shifted to a more personalized experience using portable devices such as mobile smartphones and tablets. Another trending branch of immersive multimedia is virtual reality (VR), and augmented reality (AR). Such VR and AR multimedia typically requires the user to wear a corresponding VR or AR headset, or glasses (e.g., AR glasses), where the user's vision is surrounded by a virtual world (VR), or where the user's vision and surroundings is augmented by multimedia which may or may not be localized into his/her surroundings such that they appear to be a part of the real world surroundings.

Related to VR and AR multimedia, recent advances in computer technology has also given rise to high quality gaming experiences. Without a doubt, VR gaming has exceptionally high computational requirements, but even due to the trend of mobile gaming, cloud gaming services are becoming more popular, where the heavy processing steps such as 3D game rendering and frustum culling are performed in a (cloud) server, and rendered 2D video frames are sent to the consumption device.

FIG. 1 illustrates an example of a typical cloud gaming processing flow. A game engine (i.e., remote renderer) typically exists in a cloud network server, connected to a cloud gaming device. The processing flow of the remote renderer and device is as follows:

Remote renderer composes game scene in 3D using, scene info;
Remote renderer renders 2D frame of 3D scene (frustum culling) according to updated user info/input; typical user inputs include controller control inputs;
Remote renderer compresses rendered 2D frame;
Remote renderer sends compressed rendered 2D frame to device; and/or
Device decodes and presents 2D frame.

For cloud gaming, game objects and scene info already exist in the cloud network, and only the user input is delivered to the network from the gaming device (e.g., controller input, sent via RTCP or similar, from device to network).

Figure 2:
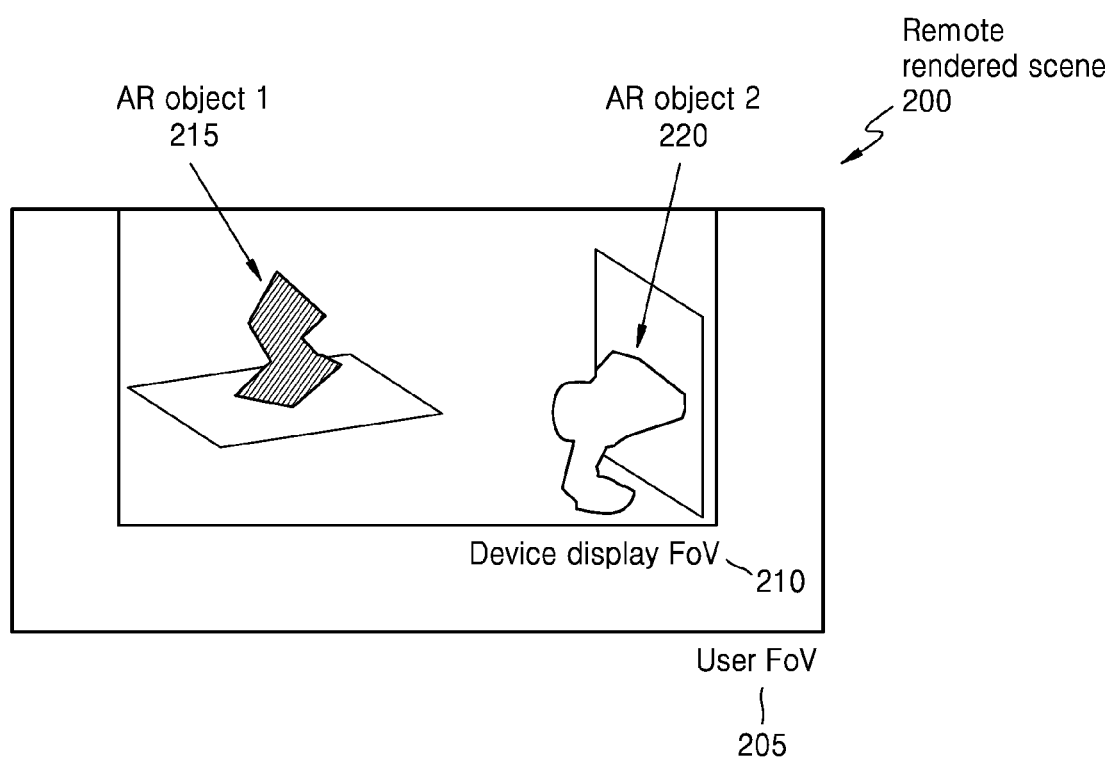
FIG. 2 illustrates the composition of user's view in AR.

FIG. 2 illustrates the composition of user's view in AR. More specifically, FIG. 2 is an example of a user's one eye view.

Remote rendered scene (200) is everything inside user field of view (FoV) (205). User FoV (205) represents the user's eyesight field of view (his/her real FoV), whilst device display FoV (210) represents the field of view of the device display, inside which the rendered AR objects (215, 220) are placed and displayed. The rendered AR objects (215, 220) are placed such that the rendered AR objects are naturally augmented into the corresponding real background surface of the user's surrounding environment. AR objects are typically 3D volumetric media, such as meshes or point clouds, and these objects are rendered according to the user's pose and scene environment, such that parallax and naturalism is achieved.

Figure 3:
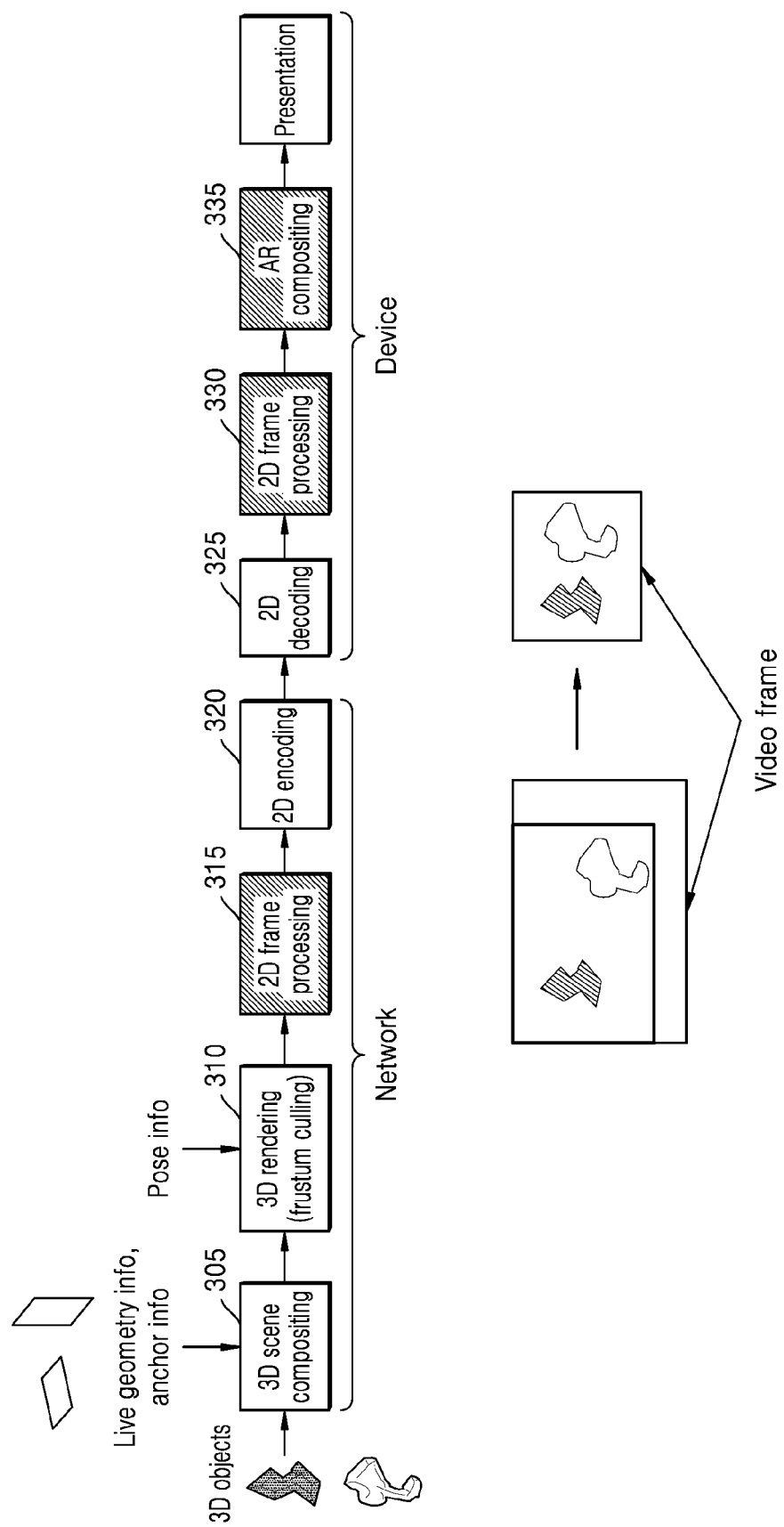
FIG. 3 illustrates a processing flow for stream based AR remote rendering according to an embodiment of the present disclosure.

FIG. 3 illustrates a processing flow for stream based AR remote rendering according to an embodiment of the present disclosure.

At step 305, after AR device sends pose information, live geometry information (or captured video) and anchor information to remote renderer, the remote renderer composes scene in 3D using pose info, live geometry information, and anchor information.

At step 310, the remote renderer renders 2D frame of 3D scene (frustum culling) according to updated pose information from the AR device.

At step 315, the remote renderer performs the rendered 2D frame processing in order to reduce redundancy. The remote renderer produces metadata associated with the processed 2D frame. According to an embodiment of the disclosure, the remote renderer performs processing such as packing, including metadata in empty pixels, creating and integrating metadata associated with the frame, including rendered viewport frame processing metadata, and AR composition metadata.

At step 320, the remote renderer compresses rendered 2D frame which has been processed.

At step 325, after the remote renderer sends compressed rendered 2D frame, together with the corresponding metadata, to the AR device, the AR device decodes rendered 2D frame.

At step 330, the AR device may perform 2D frame processing. The AR device may perform 2D frame processing either as a whole, or partial, according to regions representing AR objects, in order to better augment (compose/register) the frame into the user's latest pose. According to an embodiment of the disclosure, the AR device may recover the original frame rendered by the remote renderer, before frame processing was applied.

At step 335, the AR device (re)-composes the 2D AR frame (AR compositing) before presentation.

Due to the latency between the pose information used to render the AR frame by the remote renderer and the updated pose information of the user when the AR frame is received by the AR device, if the AR frame is rendered as is without any modification, the change in the pose of the user which occurs during the latency results in an inaccurate augmentation of the virtual objects in his/her environment. The inaccurate augmentation drastically reduces the realism of the AR experience (since the AR objects do not appear to "sit" realistically in the scene).

Figure 4:
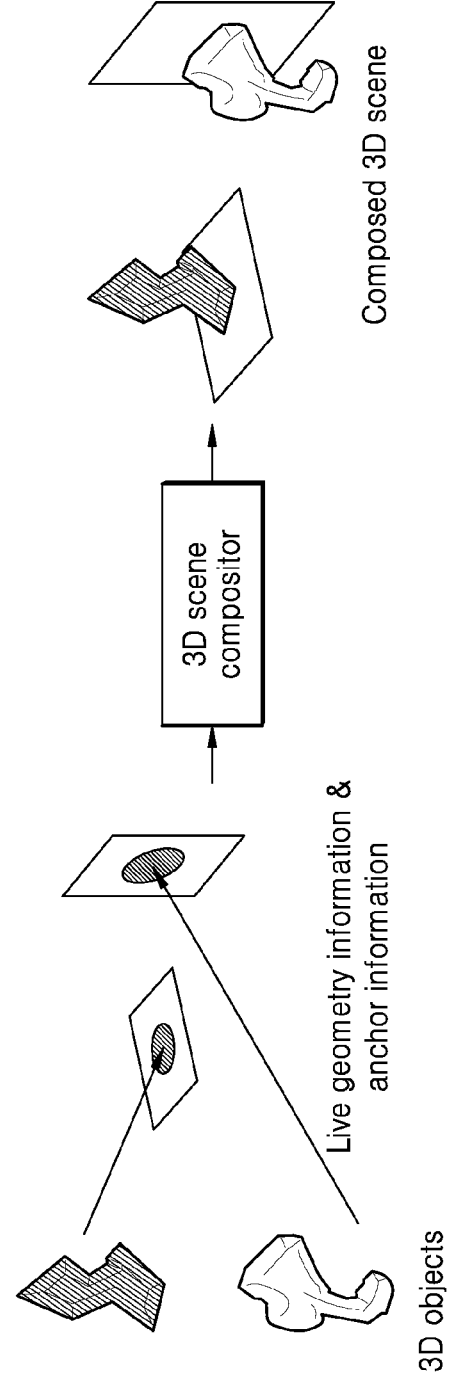
FIG. 4 illustrates a processing flow for stream based AR remote rendering according to an embodiment of the present disclosure.

FIG. 4 illustrates a processing flow for stream based AR remote rendering according to an embodiment of the present disclosure. More specifically, FIG. 4 is a diagram for specifically explaining the step 305 of FIG. 3.

A remote renderer requires an understanding of the user's surrounding environment in order to be able to compose the virtual AR objects (volumetric media or similar) into the environment such that the virtual AR objects appear to be realistic. As such, live geometry information obtained through data from the AR device is used as the basis for the user's environment. The placement of content in this environment (either through user selection or other means) is expressed as content anchor information. Once these information are readily available, 3D objects (volumetric media) can be placed in the 3D scene accordingly, resulting in a composed 3D scene, as shown in FIG. 4.

Figure 5A:
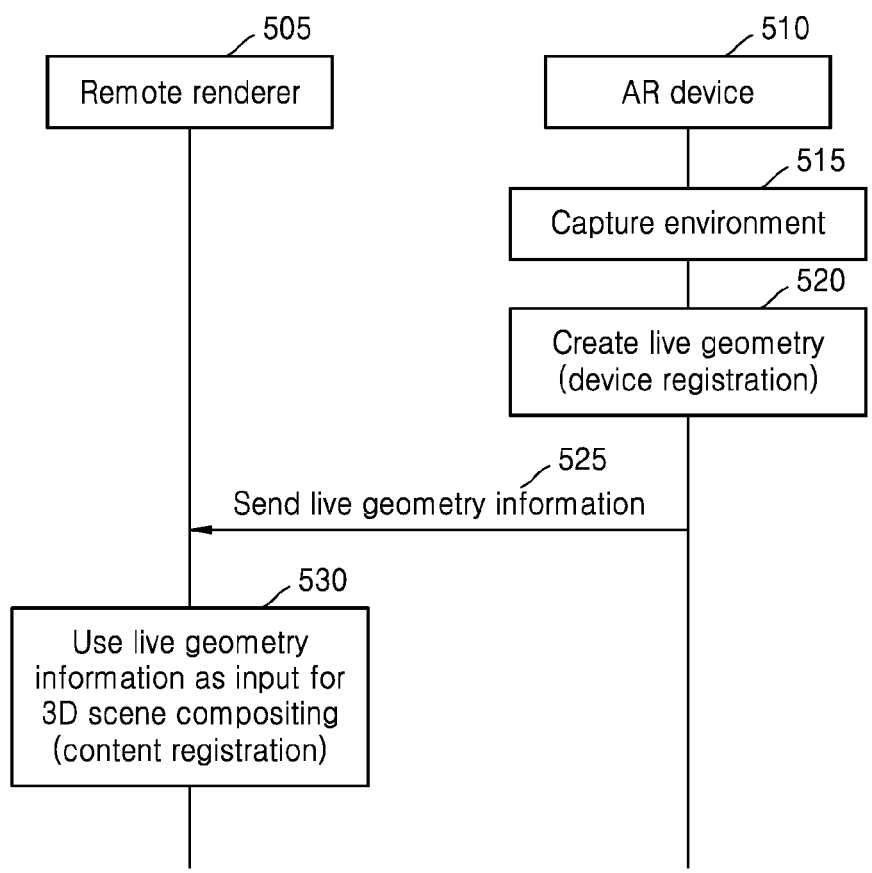
FIG. 5A illustrates a processing flow for stream based AR remote rendering according to an embodiment of the present disclosure.

FIG. 5A illustrates a processing flow for stream based AR remote rendering, according to an embodiment of the disclosure. More specifically, FIG. 5A is a scenario where the AR device (510) captures its environment via cameras (red-green-blue (RGB) and/or depth).

At step 515, the AR device (510) captures surrounding environment of the user.

At step 520, the AR device (510) creates live geometry information. The live geometry information may be typically expressed by a point cloud, or mesh, and may or may not be sparse. Important information in such the live geometry information are typically identifying surfaces in the environment (either horizontal or vertical) which can be used for content registration of AR contents (volumetric media). Certain objects can also be identified in the live geometry information (by means such as object recognition/semantic perception) such that specifically customized/made volumetric media can be augmented to such objects in the live geometry.

At step 525, the AR device (510) sends the live geometry information to remote renderer (505) for processing. Such processing is for AR device registration purposes (such as SLAM), so that volumetric media can be composed into the user's environment accurately (for content registration).

At step 530, the remote renderer (505) uses the live geometry information as the basis for 3D scene composition (content registration).

Figure 5B:
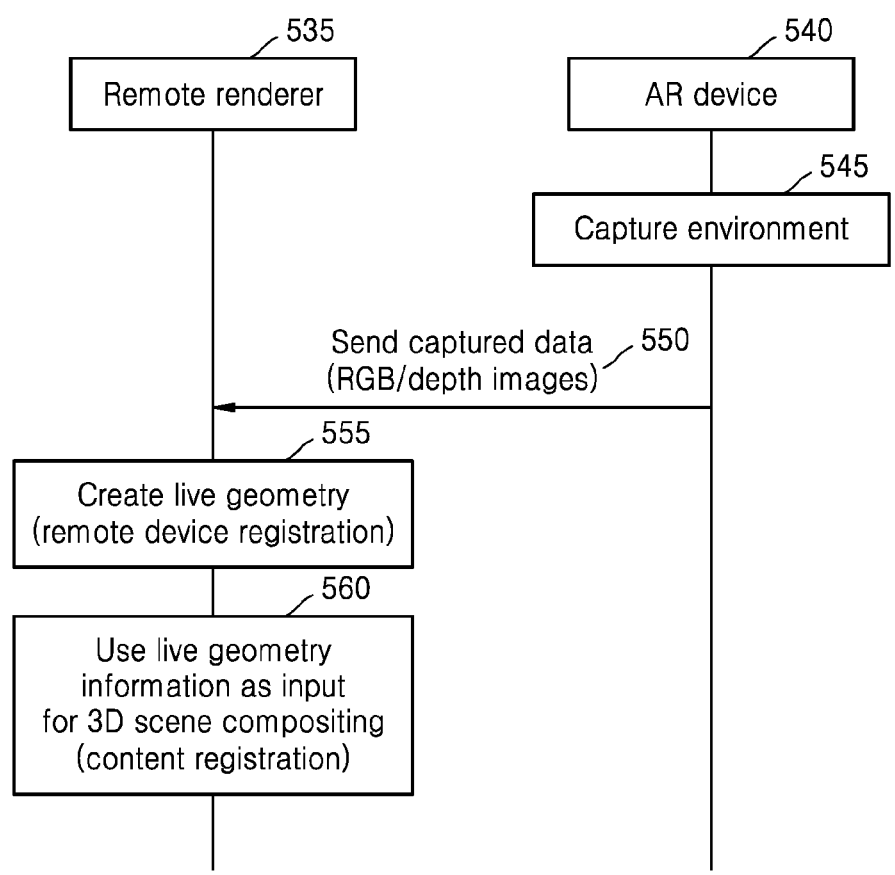
FIG. 5B illustrates a processing flow for stream based AR remote rendering according to an embodiment of the present disclosure.

FIG. 5B illustrates a processing flow for stream based AR remote rendering, according to an embodiment of the disclosure. More specifically, FIG. 5B is a scenario where remote renderer (535) performs creation of live geometry (since it is computationally heavy).

At step 545, the AR device (540) captures surrounding environment of the user.

At step 550, the AR device (540) sends the captured data to remote renderer (535). According to an embodiment of the disclosure, the captured data as RGB/depth images may be compressed by a video codec or similar.

At step 555, the remote renderer (535) creates live geometry information, based on the captured data. The live geometry information may be typically expressed by a point cloud, or mesh, and may or may not be sparse. Important information in such the live geometry information are typically identifying surfaces in the environment (either horizontal or vertical) which can be used for content registration of AR contents (volumetric media). Certain objects can also be identified in the live geometry information (by means such as object recognition/semantic perception) such that specifically customized/made volumetric media can be augmented to such objects in the live geometry.

At step 560, the remote renderer (535) uses the live geometry information as the basis for 3D scene composition (content registration).

Figure 6A:
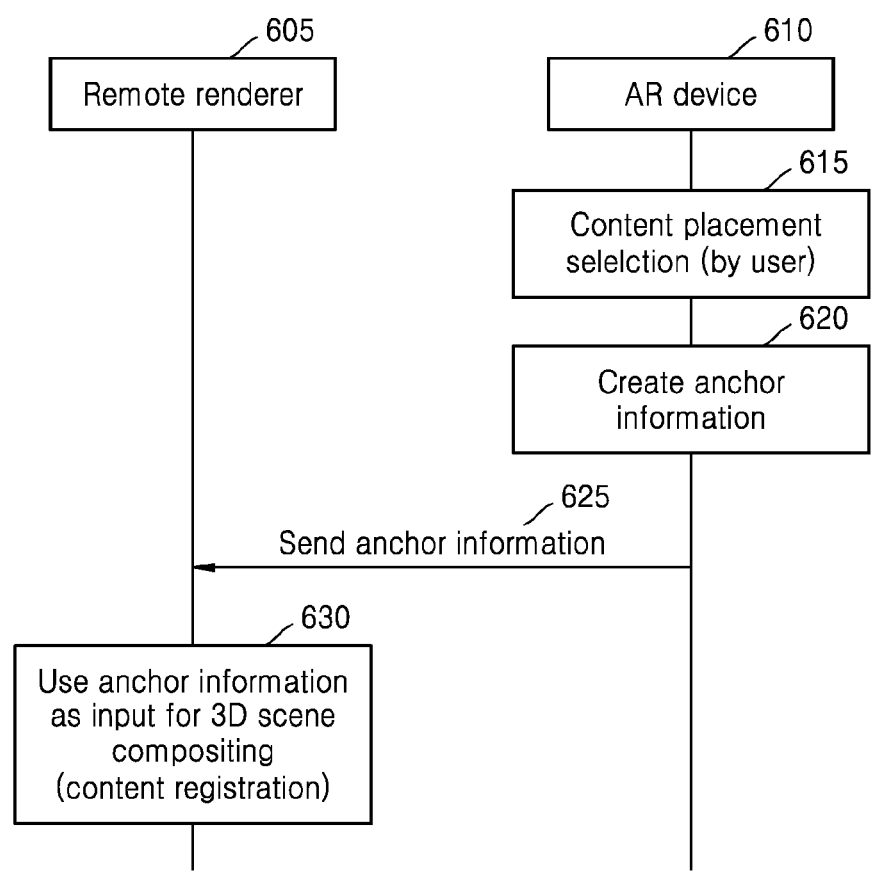
FIG. 6A illustrates a processing flow for stream based AR remote rendering according to an embodiment of the present disclosure.

FIG. 6A illustrates a processing flow for stream based AR remote rendering, according to an embodiment of the disclosure. More specifically, FIG. 6A is a scenario where anchor information is typically the output of the selection by the user of where to place an AR object, and as such is created with respect to the live geometry captured beforehand.

At step 615, the AR device (610) receives user input. According to an embodiment of the disclosure, the user input may be content placement selection.

At step 620, the AR device (610) creates anchor information. According to an embodiment of the disclosure, the anchor information may comprise information which is used as the input for content registration, for example—the location of where to place a virtual object into the scene.

At step 625, the AR device (610) sends the anchor information to the remote renderer (605).

At step 630, the remote renderer (605) uses the anchor information as the basis for 3D scene composition (content registration).

Figure 6B:
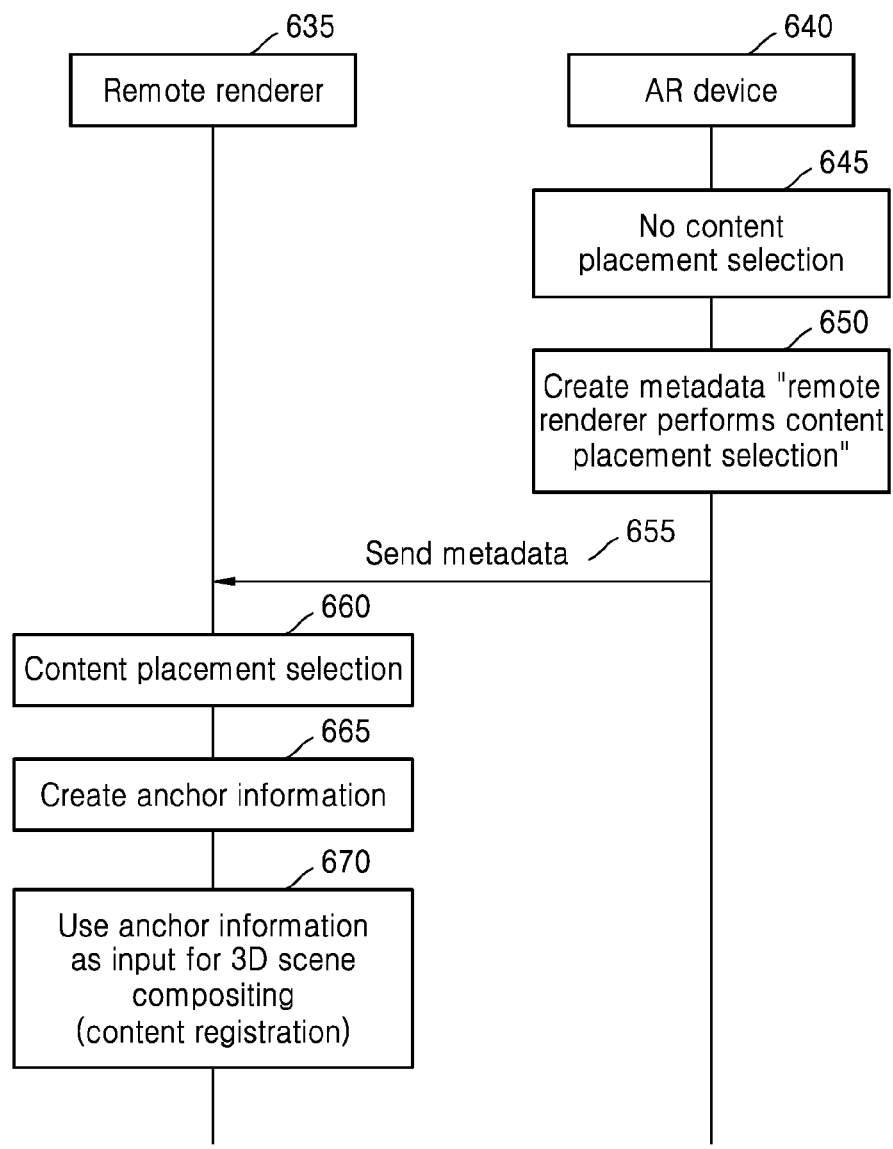
FIG. 6B illustrates a processing flow for stream based AR remote rendering according to an embodiment of the present disclosure.

FIG. 6B illustrates a processing flow for stream based AR remote rendering, according to an embodiment of the disclosure. FIG. 6B is a scenario where AR device (640) does not select a placement of an AR object specifically.

At step 645, the AR device (640) does not receive user input. According to an embodiment of the disclosure, the user input may be content placement selection. The step 645 may be omitted.

At step 650, the AR device (640) creates metadata. According to an embodiment of the disclosure, the metadata may specify the remote renderer (635) to augment the AR object(s) as seen fit. According to another embodiment of the disclosure, the metadata may indicate the remote renderer to perform content placement selection. The AR device (640) needs to notify that it wants (or needs) the remote renderer to perform the content placement selection decision (either because of capability limitations, or service characteristics), and this may be signalled via metadata such as a flag, or similar metadata.

At step 655, the AR device (640) sends metadata to the remote renderer (635).

At step 660, the remote renderer (635) performs content placement selection based on the metadata.

At step 665, the remote renderer (635) creates anchor information. According to an embodiment of the disclosure, the anchor information may comprise information which is used as the input for content registration, for example—the location of where to place a virtual object into the scene.

At step 670, the remote renderer (635) uses the anchor information as the basis for 3D scene composition (content registration).

Figure 7:
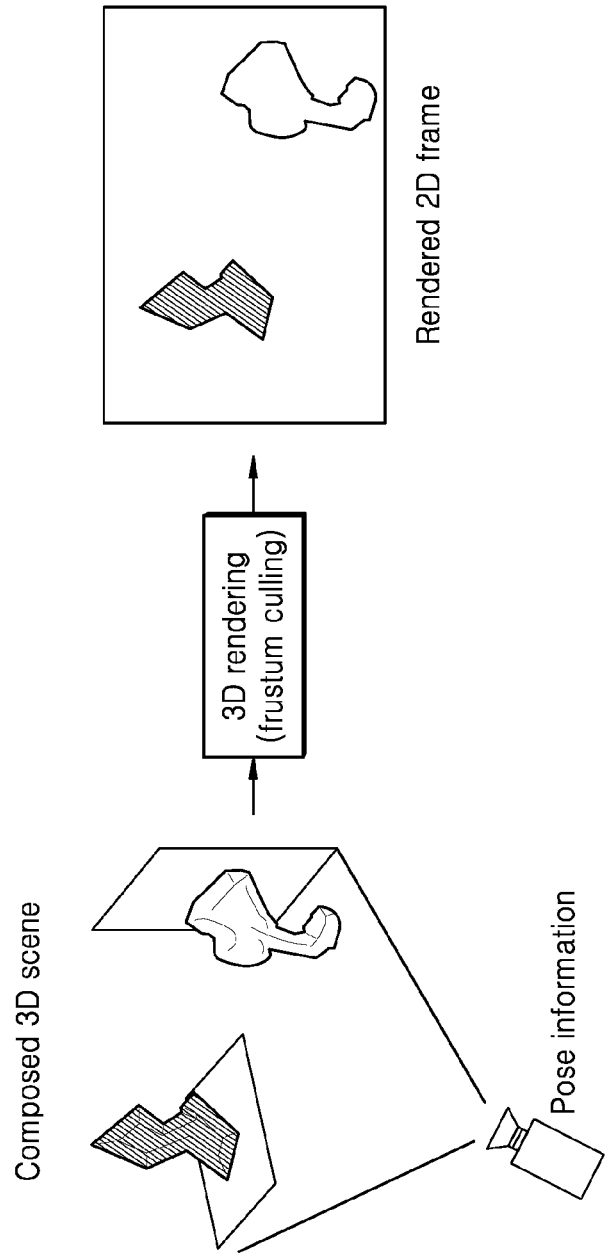
FIG. 7 illustrates a processing flow for stream based AR remote rendering according to an embodiment of the present disclosure.

FIG. 7 illustrates a processing flow for stream based AR remote rendering, according to an embodiment of the disclosure. More specifically, FIG. 7 is a diagram for specifically explaining the step 310 of FIG. 3.

Once a 3D scene is composed by the remote renderer, pose information representing the pose (including position and orientation (view direction)) of the AR device is used by the remote renderer in order to position a virtual camera representing the user (and AR device) in the composed scene. Using such information, once the virtual camera is placed, a view frustum created according to the service requirements (taking into account the network bandwidth characteristics, remote renderer processing latency, network latency, AR device processing capabilities, AR device display characteristics etc.) is used in order to create a 2D rendered view (frame) representing this virtual camera pose. Even though the composed 3D scene includes both the live geometry, anchor information and the content registered (placed) AR objects, the rendered 2D frame only contains the AR objects which have been rendered to a 2D frame based on the position and view direction of the virtual camera represented by the pose information. When rendered by the AR device at a later stage, these 2D frame rendered AR objects are placed in the AR device display such that the 2D frame rendered AR objects are augmented into the user's environment (i.e., appear to exist on a real horizontal or vertical surface in the environment).

The pose of the AR device (the user) is sent by the AR device to the remote renderer continuously, either periodically or on demand. The pose of the AR device is expressed as pose information, and can be referenced to either world coordinates (such as global positioning system (GPS) latitude, longitude), or referenced to another set of coordinates such as that of the live geometry used for device registration. This pose information typically contains data which describes the position, as well as the orientation (viewing direction). An example representation of pose information is a quaternion.

Figure 8A:
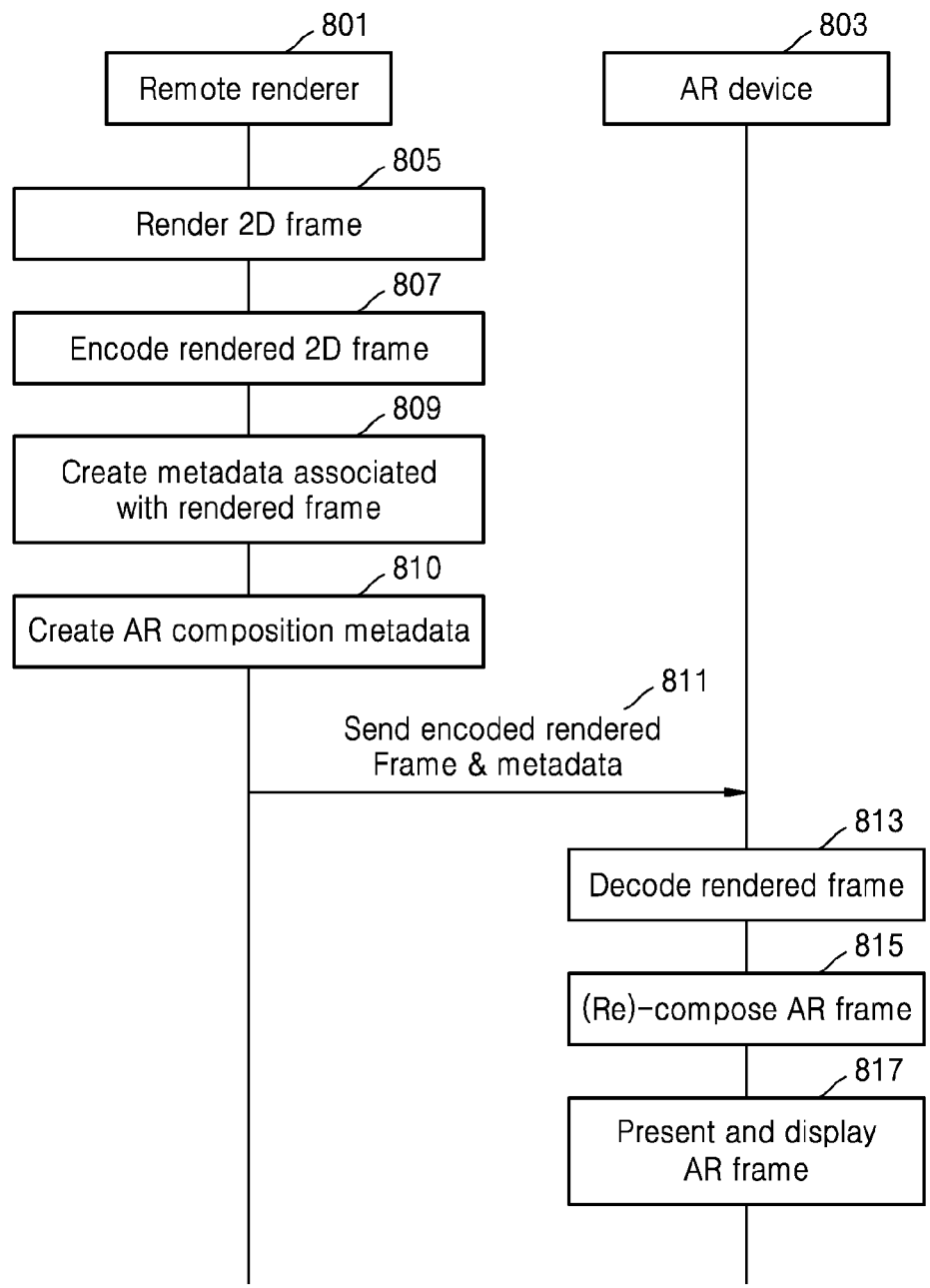
FIG. 8A illustrates a processing flow for stream based AR remote rendering according to an embodiment of the present disclosure.

FIG. 8A illustrates a processing flow for stream based AR remote rendering, according to an embodiment of the disclosure.

At step 805, the remote renderer (801) renders 2D frame.

At step 807, the remote renderer (801) encodes the rendered 2d frame. According to an embodiment of the disclosure, the rendered 2d frame may be compressed using a video codec or similar.

At step 809, the remote renderer (801) creates metadata associated with the rendered 2D frame. According to an embodiment of the disclosure, the metadata may include:
- Normal video codec parameters, typically carried within the bitstream via SEI NAL units, but may also be exposed at the delivery protocol level (e.g., SDP message, RTP payload header or similar;
- The pose information which was used to rendering the 2D frame; and/or
- The timestamp at which the 2D frame was rendered. This timestamp may also be implicitly determined via other means, such as using the RTP payload timestamp etc.

At step 810, the remote renderer (801) creates metadata associated with the AR composition of the contents within the rendered 2D frame, namely "AR composition metadata" described later in this disclosure, to be used by the AR device when (re)-composing the AR frame in step 815. Detailed descriptions of "AR compositing" and "AR composition metadata" will be described later.

According to an embodiment of the disclosure, the step 809 and the step 810 may be performed as a single step depending on implementation.

At step 811, the remote renderer (801) sends the encoded rendered frame and the metadata to the AR device (803). Also, the remote renderer (801) sends AR composition metadata to the AR device (803).

At step 813, the AR device (803) decodes the encoded rendered frame.

At step 815, the AR device (803) (re)-composes AR frame. According to an embodiment of the disclosure, the AR device (803) may require the input of AR composition metadata. The AR device's latest pose information may also be used. These are described further later in this disclosure.

At step 817, the AR device (803) presents and displays the AR frame.

Figure 8B:
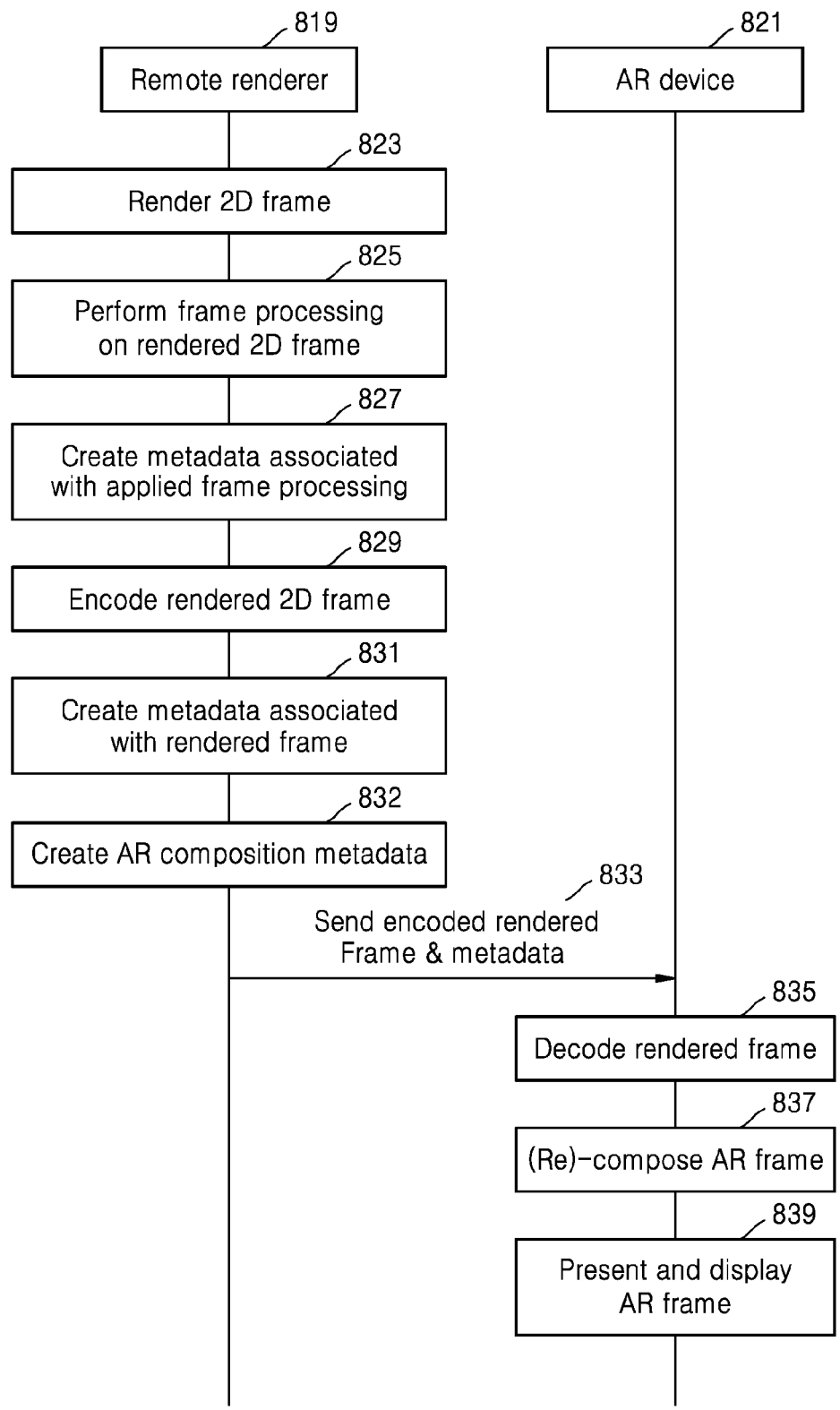
FIG. 8B illustrates a processing flow for stream based AR remote rendering according to an embodiment of the present disclosure.

FIG. 8B illustrates a processing flow for stream based AR remote rendering according to an embodiment of the present disclosure.

At step 823, the remote renderer (819) renders 2D frame.

At step 825, the remote renderer (819) performs frame processing on the rendered 2D frame. Since the rendered 2D frames only contain the rendered AR objects, there may be many redundancies in the rendered frame. In order to reduce these redundancies, it is possible to perform frame processing such as frame re-packing, pixel filling, and more, as described later in this disclosure.

At step 827, the remote renderer (819) creates metadata associated with applied frame processing. According to an embodiment of the disclosure, the metadata associated with applied frame processing may be the corresponding metadata required for the frame recovery. The frame processing will be described in more detail with FIGS. 9-12.

At step 829, the remote renderer (819) encodes the processed frame. According to an embodiment of the present disclosure, the processed frame may be compressed using a video codec or similar.

At step 831, the remote renderer (819) creates metadata associated with rendered frame. According to an embodiment of the disclosure, the metadata associated with rendered frame may include:
- Normal video codec parameters, typically carried within the bitstream via SEI NAL units, but may also be exposed at the delivery protocol level (e.g., SDP message, RTP payload header or similar;
- The pose information which was used to rendering the 2D frame; and/or
- The timestamp at which the 2D frame was rendered. This timestamp may also be implicitly determined via other means, such as using the RTP payload timestamp etc.

At step 832, the remote renderer (819) creates metadata associated with the AR composition of the contents within the rendered 2D frame, namely "AR composition metadata" described later in this disclosure, to be used by the AR device when (re)-composing the AR frame in step 837. Detailed descriptions of "AR compositing" and "AR composition metadata" will be described later.

According to an embodiment of the disclosure, the step 827, step 831 and the step 832 may be performed as a single step, or 2 steps (by combining any of the 3 steps accordingly), depending on implementation.

At step 833, the remote renderer (819) sends the encoded frame, the metadata associated with applied frame processing, and the metadata associated with rendered frame, to the AR device (821).

At step 835, the AR device (821) decodes the encoded rendered frame.

At step 837, the AR device (821) (re)-composes AR frame. According to an embodiment of the disclosure, the AR device (821) may require the input of AR composition metadata. The AR device's latest pose information may also be used. These are described further later in this disclosure.

At step 839, the AR device (821) presents and displays the AR frame.

Figure 9:
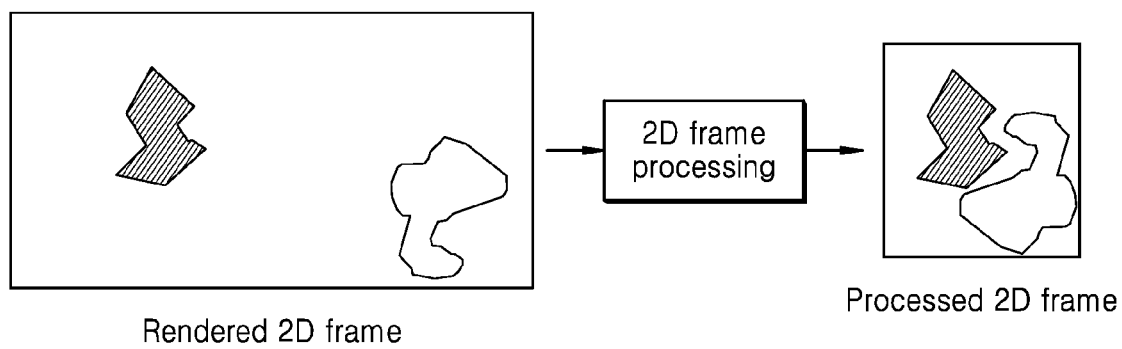
FIG. 9 illustrates a processing flow for stream based AR remote rendering according to an embodiment of the present disclosure.

FIG. 9 illustrates a processing flow for stream based AR remote rendering according to an embodiment of the present disclosure. More specifically, FIG. 9 shows an example of 2D frame processing which reduces the redundancy of the rendered 2D frame containing rendered AR objects.

In FIG. 9, the number of redundant pixels are reduced by re-packing the objects in the frame, such that the overall frame size is reduce. In this process, the location of each object in the frame may also be changed, and may also be rotated.

Possible processes to achieve this 2D frame processing are described in detail below. The different combinations of these processes used (depending on implementation) define the different embodiments defined by this disclosure for this step.

Figure 10:
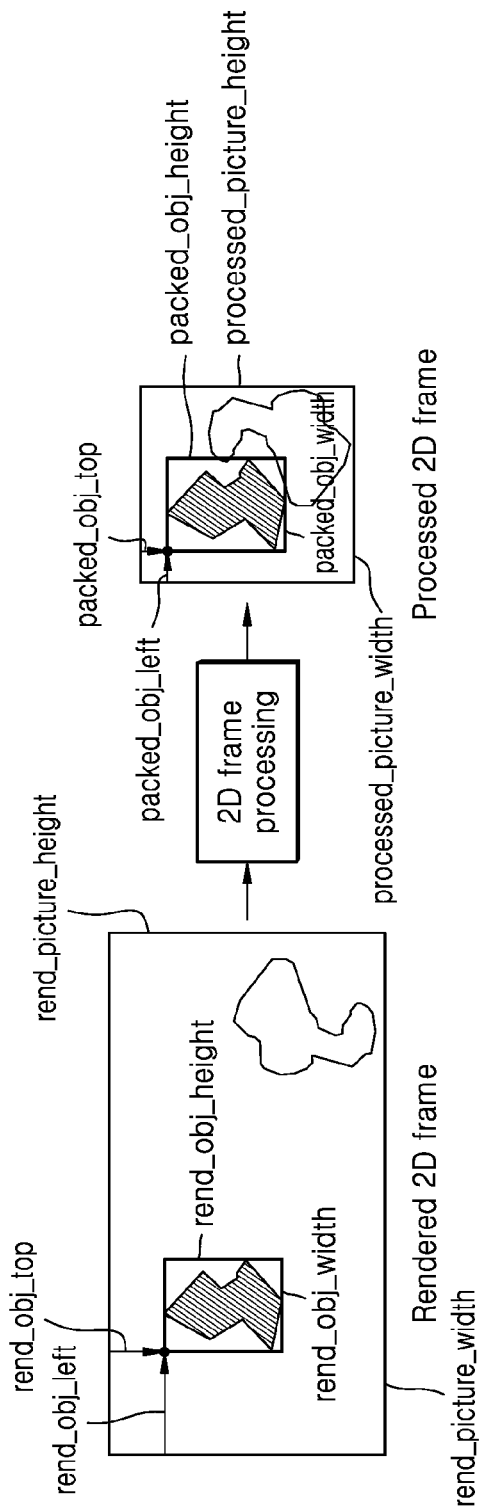
FIG. 10 illustrates a processing flow for stream based AR remote rendering according to an embodiment of the present disclosure.

FIG. 10 illustrates a processing flow for stream based AR remote rendering according to an embodiment of the present disclosure. More specifically, FIG. 10 shows an embodiment of this disclosure for object based frame packing.

The syntax below defines the object based packing structure that can be used to frame-pack the rendered frame. The corresponding semantics are shown in the figure:

- The rendered picture size as defined by rend_picture_width and rend_picture_height is typically representative of the target display resolution of the AR device (e.g., AR glasses);
- The processed picture size as defined by processed_picture_width and processed_picture_width can either be changed dynamically, or can be static; and/or
- For each object (of which there are 2 shown in FIG. 10), apart from the possibility of resizing as defined under RectObjectRegionPacking, the transform_type field also allows for the rotation of the rectangular object region such that the processed frame is tightly packed.

In both the rendered picture (rendered 2D frame) and also the processed picture (processed 2D frame), the rectangular object regions of different objects may or may not overlap, however, the active pixels in each object region may not overlap (only their inactive transparent spaces may overlap).

Syntax

According to an embodiment of the disclosure, all the syntax defined can change dynamically for each rendered frame. For identifying each region, at least one of the corner points: top-left (top, left syntax needed), top-right (top, right syntax needed), bottom-left (bottom, left syntax needed), bottom-right (bottom, right syntax needed) may also be used for signalling.

Figure 11:
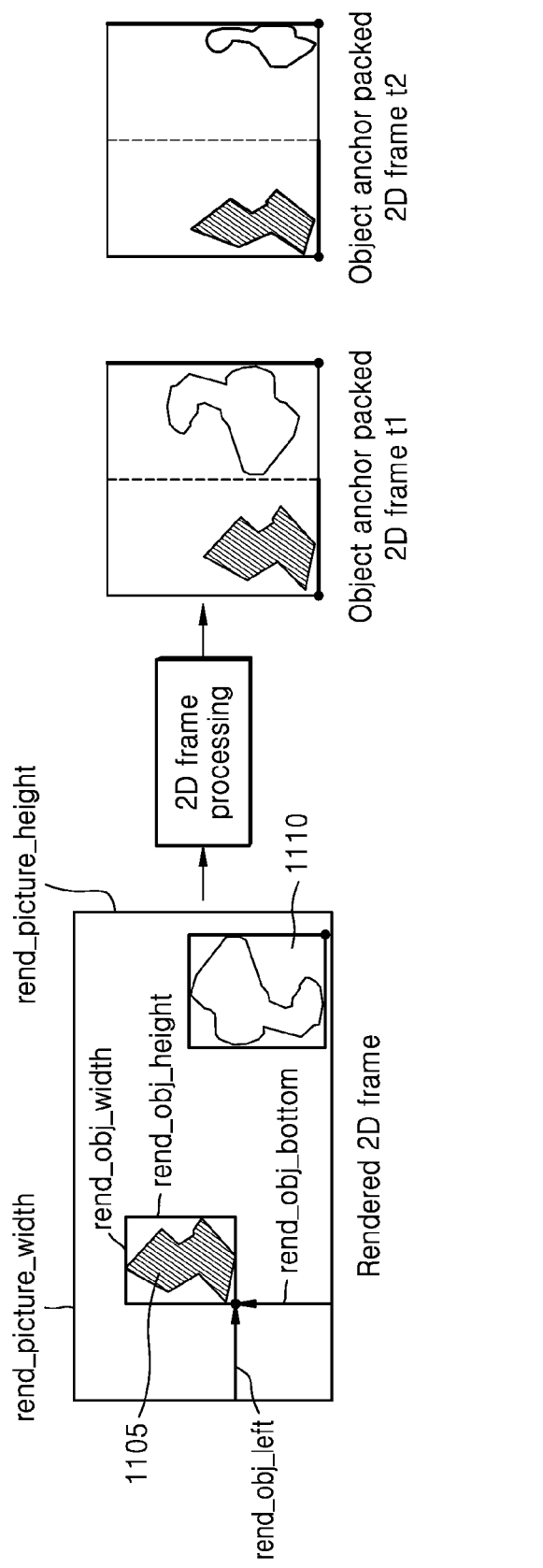
FIG. 11 illustrates a processing flow for stream based AR remote rendering according to an embodiment of the present disclosure.

FIG. 11 illustrates a processing flow for stream based AR remote rendering according to an embodiment of the present disclosure. More specifically, FIG. 11 shows an embodiment of this disclosure for object based frame packing.

According to an embodiment of the disclosure, whilst the parameters describing the rendered 2D frame change for each rendered frame, the packed object regions remain static in the processed picture. This is shown in FIG. 11. In FIG. 11, packed object regions in the processed picture are defined as two equally sized regions (left, right, separated by the dotted line), and the active pixel regions of each object in that packed object region change according to the rendered frame (see change between frame t1 and t2).

Depending on the syntax, the active pixel region for each object is placed according to a corner of the packed object region (bottom left for the object (1105), and bottom right for the object (1110). The choice for the reference of placement can correspond to the edge of the object which is used for anchoring in the user's environment (in this case the bottom edge for the object (1105), and the right edge for the object (1110).

An example syntax for this embodiment is shown below, where ObjectBasedPackingStruct is static, and RectObjectRegionPacking is dynamic.

obj_anchor_edge defines the edge of the rendered object which is used for anchor composition by the AR device.

Syntax

Figure 12:
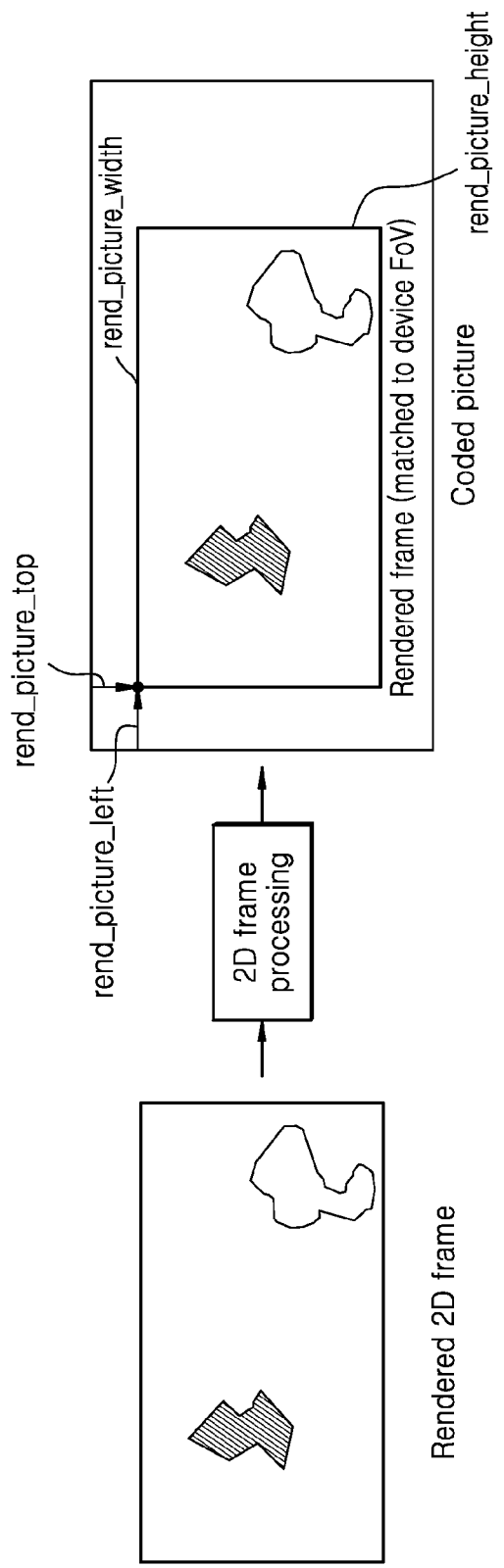
FIG. 12 illustrates a processing flow for stream based AR remote rendering according to an embodiment of the disclosure.

FIG. 12 illustrates a processing flow for stream based AR remote rendering according to an embodiment of the present disclosure.

According to an embodiment of the disclosure, as shown in FIG. 12, complex object based packing of the frame may not be necessary, but the rendered frame corresponding to the AR device's field of view may not match the selectable size/resolution supported by that of the video encoder.

In this embodiment, only the metadata to identify the rendered frame in the coded picture is necessary. The size of the coded picture can be implicitly known through coding parameters (advanced video coding (AVC) or high efficiency video coding network abstraction layer (HEVC NAL) units). If the reference point of the rendered frame is also pre-determined between the two entities (the remote renderer and the AR device), then the rend_picture_top, rend_picture_left syntax parameters are also unnecessary (i.e., if both entities pre-determine to use the top left corners of the rendered frame and the coded frame as the reference point, in which case only rend_picture_width and rend_picture_height is required).

Syntax

According to another embodiment of the disclosure, although the AR device may send its preferred display field of view and resolution to the remote renderer for the requested remote rendering service, the remote renderer may not be totally compliant in supporting the requested field of view and solution.

In this embodiment, the remote renderer may send the actual field of view (in degrees or radians) used during the frustum culling process of the render, in addition to the resolution of the rendered picture. An example of the syntax supporting this is shown below:

Syntax

AR Compositing

Remote rendering for AR is highly sensitive to latencies that occur due to processing latencies and network latencies. The key latency for remote rendering is the latency time between the sending time of pose information from the AR device to the remote renderer, and the time at which the AR device receives the rendered frame (which was rendered using the same pose information) from the remote renderer. In more detail:

- Network latency of sending pose info from AR device to remote renderer;
- Processing latency of content rendering, processing and encoding at the remote renderer; and/or
- Network latency of sending the rendered 2D frame from the remote renderer to the AR device.

The resulting sum of these latencies cannot be regarded as insignificant, and during this latency, the pose of the user (AR device) can change constantly. If the rendered frame which was rendered by the remote renderer using an old pose is displayed as-is by the AR device, there may be inaccuracies in the augmentation of the objects in the frame. As such, in one embodiment, AR composition information may be sent from the remote renderer to the AR device in order to correct such inaccuracies. Such AR composition information are described below.

AR Composition Metadata

The AR composition metadata may comprise following information (or parameter).

Object Anchor Information

Although rendered frames contain 2D renders of AR objects, in order to be able to adjust the position of each object independently in the frame according to the latest updated pose information, metadata related to the content registration (either 3D or 2D) are required. For correct content registration (augmentation), assuming that the AR device also knows the latest live geometry of the AR device surrounding environment, 3D anchor information can be used for this AR composition process. Object anchor information may include:

(1) Object anchor type and location:
  (i) Trackable, located and referenced to live geometry: a horizontal plane, a vertical plane, arbitrary plane, object surface,
  (ii) Position in world space: specified by a GPS coordinate or similar,
  (iii) Linked to another object anchor, and/or
  iv) A specific placement in the display viewport (not augmented, but overlayed in the user's viewport);
(2) Object anchor augmentation area:
  (i) Minimum/maximum/absolute surface area in the user's environment (live geometry) required for augmenting the object:
    (a) min/max area of plane required for augmentation (cm2 or m2)
    (b) surface area needed at a GPS coordinate for augmentation (cm2 or m2)
    (c) area of display required for viewport overlay of augmentation (pixels)

Rendered Object Information

Metadata related to the rendered object may also be used to more accurately place the 2D rendered object in the frame:

Average depth: the average depth (cm, m) at which the 3D object was rendered, referenced from the virtual camera placed at the position of the user/AR device, as indicated by the pose information used for the rendering by the remote renderer;

Real object size: the absolute real object size, indicated by a bounding box (height, width and depth, in cm, m); and/or Other information such as object quality ranking (ranked with regards to other rendered objects in the frame), LoD resolution, etc.

Inter Object Information

For certain AR scenes, certain AR objects may have dependencies between each other when being registered into the environment (during content registration/augmentation). In this case, additional metadata may be provided in order to describe these inter-object dependencies (one example is the linking of an object's anchor to another object through the anchor type field). Dependencies may describe limitations for augmentation, or permissions, depending on the use case.

Late Stage Re-Projection Information

Object based late stage projection information may also be sent from the remote renderer to the AR device in order to perform late stage re-projection. This set of data may or may not include the information described above, and may also contain specific depth data for objects in a form such as 2D depth maps for objects in the 2D rendered frame.

Since the AR composition metadata comprises the above-described information (or parameter), rendering data for AR media may be reduced, via AR remote rendering. Therefore, the reduced rendering data consequently reduce latencies.

Figure 13:
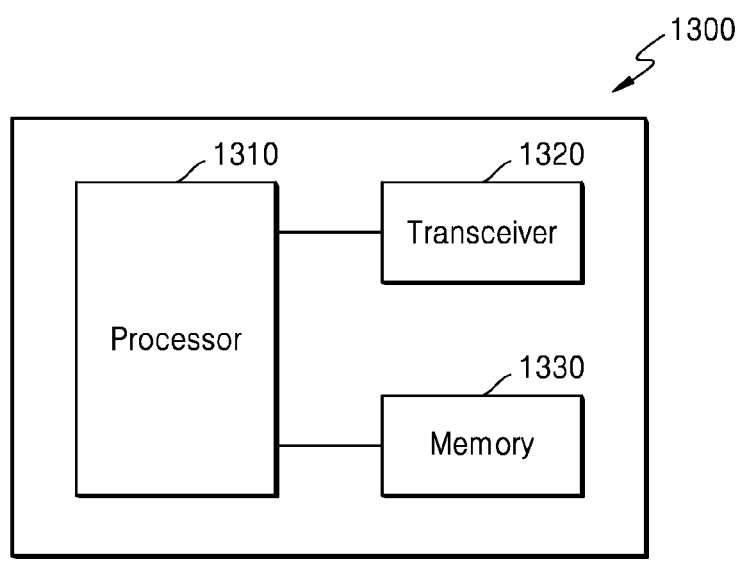
FIG. 13 illustrates an AR device according to embodiments of the present disclosure.

FIG. 13 illustrates an AR device according to embodiments of the present disclosure.

Referring to the FIG. 13, the AR device 1300 may include a processor 1310, a transceiver 1320 and a memory 1330. However, all of the illustrated components are not essential. The AR device 1300 may be implemented by more or less components than those illustrated in FIG. 13. In addition, the processor 1310 and the transceiver 1320 and the memory 1330 may be implemented as a single chip according to another embodiment.

The aforementioned components will now be described in detail.

The processor 1310 may include one or more processors or other processing devices that control the provided function, process, and/or method. Operation of the AR device 1300 may be implemented by the processor 1310.

The transceiver 1320 may include a RF transmitter for up-converting and amplifying a transmitted signal, and a RF receiver for down-converting a frequency of a received signal. However, according to another embodiment, the transceiver 1320 may be implemented by more or less components than those illustrated in components.

The transceiver 1320 may be connected to the processor 1310 and transmit and/or receive a signal. The signal may include control information and data. In addition, the transceiver 1320 may receive the signal through a wireless channel and output the signal to the processor 1310. The transceiver 1320 may transmit a signal output from the processor 1310 through the wireless channel.

The memory 1330 may store the control information or the data included in a signal obtained by the AR device 1300. The memory 1330 may be connected to the processor 1310 and store at least one instruction or a protocol or a parameter for the provided function, process, and/or method. The memory 1330 may include read-only memory (ROM) and/or random access memory (RAM) and/or hard disk and/or CD-ROM and/or DVD and/or other storage devices.

Figure 14:
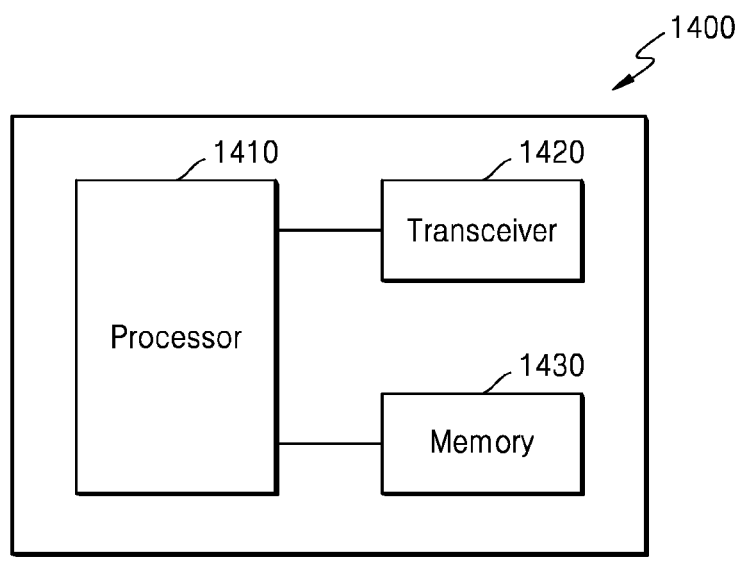
FIG. 14 illustrates a remote rendering device according to embodiments of the present disclosure.

FIG. 14 illustrates a remote rendering device according to embodiments of the present disclosure.

Referring to the FIG. 14, the remote rendering device 1400 may include a processor 1410, a transceiver 1420 and a memory 1430. However, all of the illustrated components are not essential. The remote rendering device 1400 may be implemented by more or less components than those illustrated in FIG. 14. In addition, the processor 1410 and the transceiver 1420 and the memory 1430 may be implemented as a single chip according to another embodiment.

The remote rendering device 1400 may correspond to the remote renderer described above. For example, remote rendering device 1400 may correspond to the remote renderer (635) the illustrated in FIG. 5A.

The aforementioned components will now be described in detail.

The processor 1410 may include one or more processors or other processing devices that control the provided function, process, and/or method. Operation of THE REMOTE RENDERING DEVICE 1400 may be implemented by the processor 1410.

The transceiver 1420 may include a RF transmitter for up-converting and amplifying a transmitted signal, and a RF receiver for down-converting a frequency rendering device of a received signal. However, according to another embodiment, the transceiver 1420 may be implemented by more or less components than those illustrated in components.

The transceiver 1420 may be connected to the processor 1410 and transmit and/or receive a signal. The signal may include control information and data. In addition, the transceiver 1420 may receive the signal through a wireless channel and output the signal to the processor 1410. The transceiver 1420 may transmit a signal output from the processor 1410 through the wireless channel.

The memory 1430 may store the control information or the data included in a signal obtained by the remote rendering device 1400. The memory 1430 may be connected to the processor 1410 and store at least one instruction or a protocol or a parameter for the provided function, process, and/or method. The memory 1430 may include read-only memory (ROM) and/or random access memory (RAM) and/or hard disk and/or CD-ROM and/or DVD and/or other storage devices.

At least some of the example embodiments described herein may be constructed, partially or wholly, using dedicated special-purpose hardware. Terms such as "component," "module" or "unit" used herein may include, but are not limited to, a hardware device, such as circuitry in the form of discrete or integrated components, a field programmable gate array (FPGA) or application specific integrated circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract and drawings), or to any novel one, or any novel combination, of the steps of any method or process so disclosed.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for an augmented reality (AR) remote rendering process performed by a remote rendering device, the method comprising:
   compositing a three-dimension (3D) scene based on live geometry information and anchor information;
   receiving, from an AR device, pose information;
   rendering a 2D frame of the composited 3D scene based on the pose information;
   performing a 2D frame processing operation for reducing a number of redundant pixels and a frame size of the 2D frame by repacking an objects in the 2D frame on the rendered 2D frame;
   creating first metadata for a frame recovery, the first metadata being associated with the 2D frame processing operation, second metadata associated with the rendered 2D frame and third metadata associated with an AR frame compositing the rendered 2D frame; and
   transmitting, to the AR device, the rendered 2D frame, the first metadata, the second metadata, and the third metadata.

2. The method of claim 1, further comprising receiving, from the AR device, wherein the live geometry information and the anchor information.

3. The method of claim 1, further comprising:
   receiving, from the AR device, captured data that is identified as red-green-blue (RGB)/depth images;
   creating the live geometry information based on the captured data;
   receiving, from the AR device, metadata including information indicating that the remote rendering device performs a content placement selection operation;
   performing the content placement selection operation; and
   creating the anchor information.

4. The method of claim 1, wherein the second metadata associated with the rendered 2D frame comprise at least one of:
   video codec parameters;
   the pose information associated with the rendered 2D frame; or
   a timestamp associated with the rendered 2D frame.

5. A method for an augmented reality (AR) remote rendering process performed by an AR device, the method comprising:
   receiving, from a remote rendering device, a rendered two-dimensional (2D) frame, first metadata for a frame recovery, the first metadata being associated with a 2D frame processing operation, second metadata associated with the rendered 2D frame, and third metadata associated with an AR frame compositing the rendered 2D frame, wherein the 2D frame processing operation is for reducing a number of redundant pixels and a frame size of the 2D frame by repacking an objects in the 2D frame on the rendered 2D frame;
   compositing the AR frame based on the first metadata, the second metadata, and the third metadata; and
   displaying the composited AR frame.

6. The method of claim 5, further comprising:
   transmitting, to the remote rendering device, live geometry information and anchor information.

7. The method of claim 5, further comprising:
transmitting, to the remote rendering device, captured data that is defined as red-green-blue (RGB)/depth images; and
transmitting, to the remote rendering device, metadata including information indicating that the remote rendering device performs a content placement selection operation.

8. The method of claim 5, wherein the second metadata associated with the rendered 2D frame comprise at least one of:
video codec parameters;
pose information associated with the rendered 2D frame; or
a timestamp associated with the rendered 2D frame.

9. A remote rendering device comprising:
a transceiver; and
a processor coupled with the transceiver and configured to:
composite a three-dimensional (3D) scene based on live geometry information and anchor information;
receive, from an augmented reality (AR) device via the transceiver, pose information;
render a 2D frame of the composited 3D scene based on the pose information;
perform a 2D frame processing operation for reducing a number of redundant pixels and a frame size of the 2D frame by repacking an objects in the 2D frame on the rendered 2D frame;
create first metadata for a frame recovery, the first metadata being associated with the 2D frame processing operation, second metadata associated with the rendered 2D frame and third metadata associated with an AR frame compositing the rendered 2D frame; and
transmit, to the AR device via the transceiver, the rendered 2D frame, the first metadata, the second metadata, and the third metadata.

10. The remote rendering device of claim 9, wherein the processor is further configured to receive, from the AR device via the transceiver, the live geometry information and the anchor information.

11. The remote rendering device of claim 9, wherein the processor is further configured to:
receive, from the AR device via the transceiver, captured data that is identified as red-green-blue (RGB)/depth images;
create the live geometry information based on the captured data;
receive, from the AR device via the transceiver, metadata including information indicating that the remote rendering device performs a content placement selection operation;
perform the content placement selection operation; and
create the anchor information.

12. The remote rendering device of claim 9, wherein the second metadata associated with the rendered 2D frame comprises at least one of:
video codec parameters;
the pose information associated with the rendered 2D frame; or
a timestamp associated with the rendered 2D frame.

13. An augmented reality (AR) device comprising:
a transceiver; and
a processor coupled with the transceiver and configured to:
receive, from a remote rendering device via the transceiver, a rendered two-dimensional (2D) frame, first metadata for a frame recovery, the first metadata being associated with a 2D frame processing operation, second metadata associated with the rendered 2D frame, and third metadata associated with an AR frame compositing the rendered 2D frame, wherein the 2D frame processing operation is for reducing a number of redundant pixels and a frame size of the 2D frame by repacking an objects in the 2D frame on the rendered 2D frame;
compositing the AR frame based on the first metadata, the second metadata and the third metadata; and
display the composited AR frame.

14. The AR device of claim 13, wherein the processor is further configured to:
transmit, to the remote rendering device via the transceiver, live geometry information and anchor information.

15. The AR device of claim 13, wherein the processor is further configured to:
transmit, to the remote rendering device via the transceiver, captured data that is defined as red-green-blue (RGB)/depth images; and
transmit, to the remote rendering device via the transceiver, metadata including information indicating that the remote rendering device performs a content placement selection operation.

16. The AR device of claim 13, wherein the second metadata associated with the rendered 2D frame comprise at least one of:
video codec parameters;
pose information associated with the rendered 2D frame; or
a timestamp associated with the rendered 2D frame.

* * * * *